(12) United States Patent
Breiholz

(10) Patent No.: US 8,072,581 B1
(45) Date of Patent: Dec. 6, 2011

(54) LASER RANGE FINDING SYSTEM USING VARIABLE FIELD OF ILLUMINATION FLASH LIDAR

(75) Inventor: Arlen E. Breiholz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1357 days.

(21) Appl. No.: 11/655,437

(22) Filed: Jan. 19, 2007

(51) Int. Cl.
*G01C 3/08* (2006.01)
(52) U.S. Cl. ...................... 356/5.01; 356/4.01
(58) Field of Classification Search ............. 356/4.01, 356/5.01, 5.15, 28, 29, 139.01; 359/399; 701/223
See application file for complete search history.

(56) References Cited

U.S. PATENT DOCUMENTS

| | | | |
|---|---|---|---|
| 5,365,218 A * | 11/1994 | Otto .............................. | 340/557 |
| 5,446,529 A | 8/1995 | Stettner | |
| 5,696,577 A | 12/1997 | Stettner | |
| 6,133,989 A | 10/2000 | Stettner | |
| 6,176,837 B1 | 1/2001 | Foxlin | |
| 6,392,747 B1 | 5/2002 | Allen | |
| 6,414,746 B1 | 7/2002 | Stettner | |
| 6,522,396 B1 | 2/2003 | Halmos | |
| 6,526,352 B1 * | 2/2003 | Breed et al. .................... | 701/213 |
| 6,741,341 B2 * | 5/2004 | DeFlumere ................ | 356/141.1 |
| 6,922,632 B2 | 7/2005 | Foxlin | |
| 7,015,831 B2 | 3/2006 | Karlsson | |
| 7,098,999 B1 | 8/2006 | Halmos | |
| 7,649,616 B2 * | 1/2010 | Michael et al. .............. | 356/4.01 |
| 7,859,649 B2 * | 12/2010 | Gesner et al. ................ | 356/4.01 |
| 2004/0119838 A1 | 6/2004 | Griffis | |
| 2005/0182518 A1 | 8/2005 | Karlsson | |
| 2005/0234679 A1 | 10/2005 | Karlsson | |
| 2006/0227316 A1 * | 10/2006 | Gatt ........................... | 356/5.09 |

FOREIGN PATENT DOCUMENTS

DE 2930937 A * 2/1981

* cited by examiner

*Primary Examiner* — Isam Alsomiri
(74) *Attorney, Agent, or Firm* — Daniel M. Barbieri

(57) ABSTRACT

The laser range finding system includes a light detection and ranging (LIDAR) sensor unit (SU) and a LIDAR processor unit (PU). The LIDAR SU is for transmitting light pulses and receiving resulting input light signals reflected from objects within the field of view of the SU. The LIDAR SU includes a flash LIDAR illuminating laser source for transmitting light pulses. The LIDAR illuminating laser source includes an illuminating laser and zoom optics operatively associated with the laser. A LIDAR receiver receives resulting input light signals reflected from the objects. The LIDAR receiver includes a sensor; and, a flash readout integrated circuit (IC). The flash readout IC measures the transit time of the light pulses. The LIDAR processor unit (PU) is operatively associated with the LIDAR SU and it utilizes flash LIDAR ranging. A power source is operatively coupled to the LIDAR PU. Zooming of the transmitted light pulses results in the received resulting input light signals illuminating a relatively reduced area of the frame. Thus, a flash LIDAR image of relatively reduced resolution but enhanced range is provided by utilization of the transit time measurements.

18 Claims, 4 Drawing Sheets

WIDE POSITION

NARROW POSITION

LASER RANGE FINDING SYSTEM USING VARIABLE FIELD OF ILLUMINATION FLASH LIDAR

BACKGROUND OF THE INVENTION

1. Field of the Invention

The present invention relates generally to measurement of distance to visual landmarks for applications including navigation and mapping, and more particularly navigation and mapping in a Global Positioning System (GPS) denied environment.

2. Description of the Related Art

There is a growing need to provide underground, urban, and indoor navigation without the use of external augmentation aids or GPS. Tracking or navigation systems often make use of measurements from sensors to aid in determining a location ("localization") or an orientation (attitude and heading) or a pose (position and orientation) of an object such as a person, a vehicle or a robot as it navigates in an environment, such as within the bounds of a building. A variety of types of sensors are available for such systems, including sensors that measure a relative location between a sensor and a target. An example of such a sensor/target combination is a pulsed laser emitter and a photosensor that can determine a distance traveled by the laser pulse by measuring time of flight. Different types of sensors measure different aspects of the relative pose of a sensor and a target, such as a range, direction, or relative orientation.

Location and mapping is a fundamental problem in mobile robotics. While a robot navigates in an unknown environment, it must incrementally build a map of its surroundings and, at the same time, localize itself within that map. One popular solution is to use Simultaneous Localization and Mapping (SLAM) algorithms, treat localization and mapping as an estimation problem and apply a Kalman filter.

As will be disclosed below, the present invention supplies technology components that can supply target range and bearing information to a SLAM algorithm using a very compact, low-power sensor. Further, the disclosed design allows the range of the sensor to be extended at the expense of spatial resolution in cases where the range from sensor to target is too great for the sensor to operate normally.

Flash LIDAR, which illuminates a scene using a single laser pulse that is optically spread to cover the field of view of a gated focal plane array, outputs an image in which each pixel is labeled with both brightness and range. This ability to simultaneously range to all objects in a scene is extremely useful for unmanned ground vehicles as well as for general reconnaissance and surveillance.

The alternative to Flash LIDAR is a scanning LIDAR. This uses a pencil laser beam with a single sensor and a moving mirror assembly that scans the beam across the scene. Aside from the potential difficulties with rapidly moving parts, the fact that all pixels in a scene are sampled sequentially can lead to distortion or misperception if there is relative motion between the sensor and all or part of the scene.

A major drawback to the use of flash LIDAR is that the spreading of the illuminating laser beam introduces a quadratic fall-off in illumination with range. In a GPS-Denied Navigation activity for dismounted troops, the range of the flash LIDAR is limited due to the requirement that the LIDAR be body-worn. Both available battery power and heat that must be dissipated from the unit contribute to this restriction. Heretofore, it has been necessary to sacrifice field of view by using longer focal length optics on the flash LIDAR in order to achieve acceptable range for a man-worn system.

U.S. Pat. No. 6,414,746, issued to R. Stettner, et al., entitled "3-D Imaging Multiple Target Laser Radar," assigned to Advanced Scientific Concepts, Inc., Santa Barbara, Calif., discloses a device which uses a single pulse from a pulsed light source to detect objects which are obscured by camouflage, fog or smoke but otherwise enveloped by a light-transmitting medium. The device simultaneously operates in two modes, light reflected from the nearest object is processed to form a three-dimensional image by an array of pixels. This first image is based upon the light-pulse transit time recorded in each pixel. Each pixel also contains a high-speed analog memory that sequentially stores reflected signals at a repeated time interval. The first reflection acts as a time base that controls when the analog memory begins or ends the storage sequence. The first return could be from a camouflage net and the amplitudes of the return signals, after the first return, would then be from objects behind the net. Computer processing these amplitudes reveals the three-dimensional nature of the obscured objects. The device consists of the pulsed light source, optics for collecting the reflected light, a sensor for detecting the light and converting it to electrical data, drive and output electronics for timing and signal conditioning of data generated by the sensors and a computer for processing the sensor data and converting it to a three dimensional image. The sensor collects and processes the light data in a unique manner, first converting it to electricity by a number of alternate detector technologies and then using integrated circuit chips which consist of a two dimensional array of electronic pixels also called unit cells. The two dimensional array defines two dimensions of the image. Stored within each unit cells is data associated with the third dimension, ranges of targets, and amplitudes of target reflections. This data are read out of the integrated circuit chip in the time interval between laser pulses to a processing computer. The processing computer corrects the data and, by means of computer algorithms specific to the device, converts the data to a three-dimensional image of one or more targets. This image may be viewed or processed electronically to isolate targets.

Other Advanced Scientific Concepts, Inc. assigned patents include U.S. Pat. Nos. 6,133,989, 5,696,577, and 5,446,529.

None of the aforementioned references provide an efficient flash LIDAR system for laser range finding that is particularly suitable for man worn applications.

SUMMARY OF THE INVENTION

In a broad aspect, the present invention is a laser range finding system that includes a light detection and ranging (LIDAR) sensor unit (SU) and a LIDAR processor unit (PU). The LIDAR SU is for transmitting light pulses and receiving resulting input light signals reflected from objects within the field of view of the SU. The LIDAR SU includes a flash LIDAR illuminating laser source for transmitting light pulses. The LIDAR illuminating laser source includes an illuminating laser and zoom optics operatively associated with the laser. A LIDAR receiver receives resulting input light signals reflected from the objects. The LIDAR receiver includes a sensor; and, a flash readout integrated circuit (IC). The flash readout IC measures the transit time of the light pulses. The LIDAR processor unit (PU) is operatively associated with the LIDAR SU and it utilizes flash LIDAR ranging. A power source is operatively coupled to the LIDAR PU. Zooming of the transmitted light pulses results in the received resulting input light signals illuminating a relatively reduced area of the frame, thus providing a flash LIDAR image of relatively reduced resolution but enhanced range by utilization of the transit time measurements.

The LIDAR receiver preferably operates as a passive imager part of the time to allow an operator to point said sensor, allowing an area of interest to be centered in a frame.

The LIDAR illuminating laser source may include an optical view finder coupled with the zoom optics.

The inventive concepts herein may provide an efficient flash LIDAR system for laser range finding that is particularly suitable for man worn applications. The system may include a computer system coupled to the LIDAR PU for receiving processed navigation and mapping information from the LIDAR PU and providing an optimized geo-referenced map of the path traversed. In such an instance the laser range finding system operates as a navigation and mapping system, wherein the LIDAR PU comprises a LIDAR navigation processor unit (NPU) and the LIDAR SU comprises a LIDAR navigation sensor unit (NSU).

DETAILED DESCRIPTION OF THE INVENTION

Figure 1:
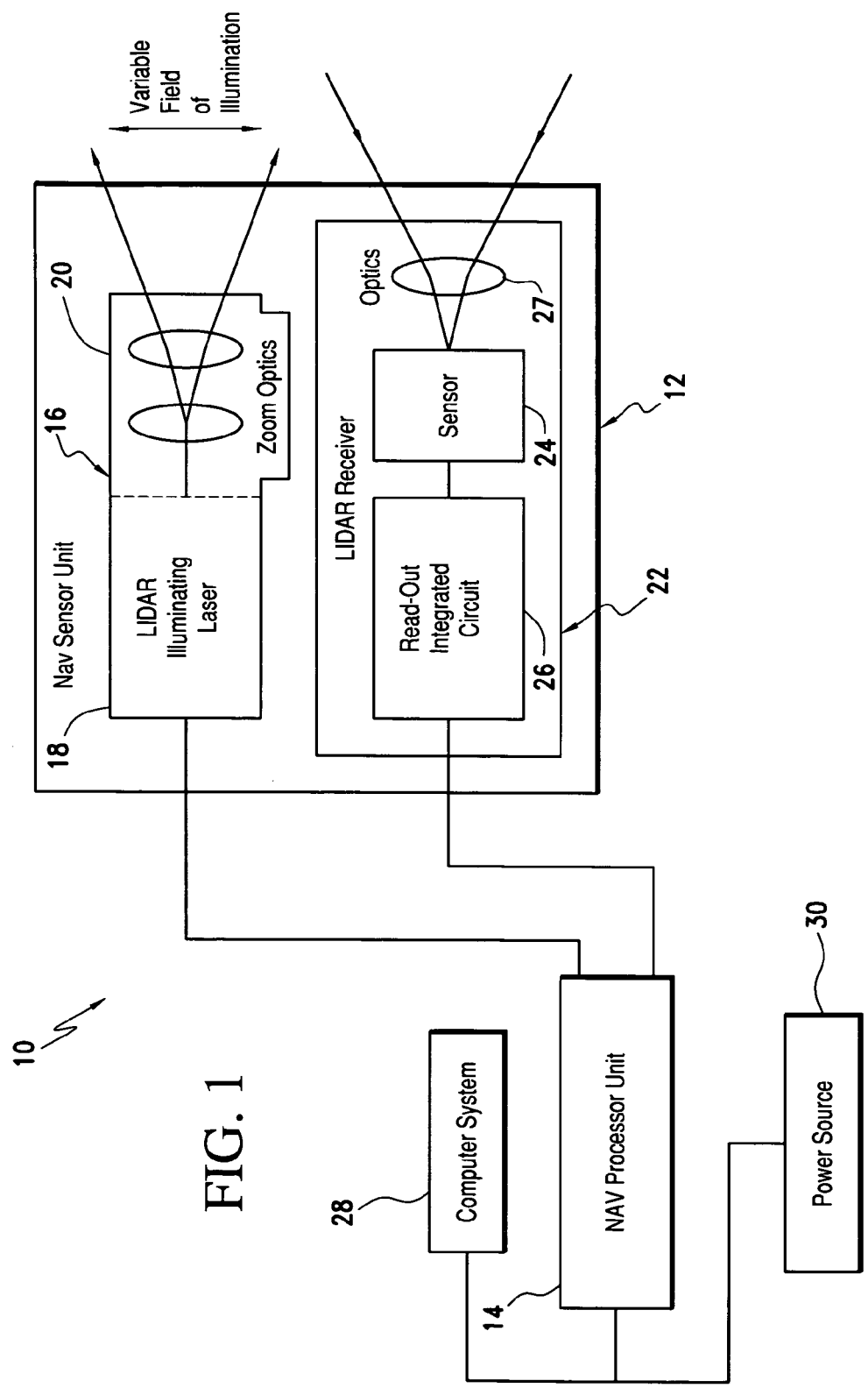
FIG. 1 is a block diagram of the laser range finding system of the present invention.

Referring now to the drawings and the characters of reference marked thereon, FIG. 1 illustrates a laser range finding system, designated generally as 10. A light detection and ranging (LIDAR) sensor unit (SU), designated generally as 12, transmits light pulses and receives resulting input light signals reflected from objects within its field of view. A LIDAR processor unit (PU) 14 is operatively associated with the LIDAR SU 12. The LIDAR PU 14 utilizes flash LIDAR ranging.

The SU 12 includes a flash LIDAR illuminating laser source 16 for transmitting light pulses. The LIDAR illuminating laser source includes an illuminating laser 18 and zoom optics 20 operatively associated with the laser 18. A LIDAR receiver, designated generally as 22, receives resulting input light signals reflected from the objects within the field of view. The LIDAR receiver includes a sensor 24; and, a flash readout integrated circuit (IC) 26. The flash readout IC 26 measures the transit time of the light pulses. The LIDAR receiver 22 also includes suitable optics 27.

In the specific application of the invention, shown in FIG. 1 this system 10 is implemented as a navigation and mapping system. In such an implementation, the LIDAR PU 14 comprises a LIDAR navigation processor unit (NPU) and the LIDAR SU 12 comprises a LIDAR navigation sensor unit (NSU). A computer system 28 is coupled to the LIDAR NPU 14 for receiving processed navigation and mapping information from the LIDAR NPU 14 and providing an optimized geo-referenced map of the path traversed.

In a personalized handheld application the LIDAR NSU 12 preferably includes a miniature flash Laser Imaging Detection and Ranging (LIDAR) sensor 24 with an integrated Inertial Measurement Unit (IMU) that serves as the primary mapping and navigation sensor for the system 10. It typically includes a GPS antenna. The use of accurate local Flash LIDAR ranging corrects a Dead Reckoning (DR) module when GPS is unavailable. The LIDAR NSU 12 includes the components essential for operation such as a LIDAR transmitter, LIDAR Focal Plane Array (FPA) and LIDAR Pre-Processing.

In a preferred embodiment an embedded GB-GRAM military GPS card provides typical accuracy of 2 to 4 meters and can be used when possible. The basic DR module is composed of a combination of 3 axis gyros, magnetic compasses, and accelerometers incorporated in the Flash LIDAR sensor unit. Personal position estimates from the DR sensors are fused together using technology that uses recursive algorithms to optimize raw sensor data with typical body motion logic to reduce sensor drift.

The LIDAR NSU 12 may include other types of sensors such as imaging sensors, for example, Electro-Optic (EO)/Infrared (IR); Low Light Television (LLTV); Synthetic Aperture Radar (SAR); Ultra Wide Band (UWB); and Chemical, Biological, Nuclear, Radiological, and Explosives (CBNRE). Acoustic sensors may be used such as gunfire, seismic, and sonar. Communication links may be used to share situational awareness between multiple users.

The LIDAR NPU 14 includes a subsystem module which includes a LIDAR power supply and LIDAR post-processing module. Another subsystem module within the LIDAR NPU 14 includes a navigation processor power supply and GB-GRAM GPS receiver.

The computer system 28 is coupled to the LIDAR NPU 14 for receiving processed navigation and mapping information from the LIDAR NPU 14 and providing an optimized geo-referenced map of the path traversed. This computer system 28 is preferably a handheld unit such as a Commercial Off-The-Shelf (COTS)/Military Off-The-Shelf (MOTS) handheld computer with large-format keypad for easy input of position information and user interaction with the remainder of the system 10. A power source 30, e.g. battery, provides power to the LIDAR NPU 14 and the computer system 20.

A foot-mounted sensor may be included to improve accuracy Dead Reckoning (DR). Sensor drift corrections are provided by using Zero velocity Updates (ZUPT) when the foot is stationary. This optional foot-mounted sensor may be provided by a MEMs type small inertial package if required.

The LIDAR NSU and LIDAR NPU may be integrated as a single system. Such an Integrated LIDAR/INS Navigation System (LIINS) combines the concept of a standard INS with a SLAM algorithm. In this system, an IMU provides IMU sensor data (delta velocity and delta angle measurements) to an Inertial Navigation System (INS). The strapdown navigator integrates the sensor data to compute a current estimate of position, velocity, and attitude. The IMU and the strapdown navigator comprise the INS. In order to constrain error growth due to errors in the sensor data, an extended Kalman Filter is provided to estimate errors, system position, velocity, attitude, as well as sensor data errors—bias and scale factor. Measurement inputs to the Kalman filter include range and range rate measurements based upon LIDAR transmissions. The raw reflection data originating from the LIDAR light source (NSU 12) is collected on the focal plane array on NSU 12, read out and provided to a reflection point manager, part of the NPU 14. This function is responsible for identifying usable reflection points, and correlating their respective locations across LIDAR image frames. Once reflection points have been identified, range and range rate measurements to those reflection points are computed and provided to the Kalman filter. These measurements are then used as the basis for estimating errors in the system solution. The IMU is fixed to the LIDAR so that the measurements from the LIDAR may be easily represented in a known reference frame. In addition, the Kalman filter provides reflection point location error estimates to the reflection point manager.

The Kalman filter estimates system solution errors (three position and three velocity), sensor data errors (three accelerometer bias, three gyro bias, three accelerometer scale factor, three gyro scale factor) and reflection point position error (three for each reflection point in use). There are two measurements per reflection point (range and range rate) which provide observability to the system states. Since the range to the reflection points is likely to be relatively small, there could be significant changes in line of sight angles. Therefore, the Kalman filter will be implemented as a Gaussian second-order filter.

The LIDAR NPU 14 preferably solves the simultaneous localization and mapping (SLAM) problem using a thin junction tree filter (TJTF), thereby correcting real time dead reckoning/IMU error drift.

The LIDAR NPU 14 may include other types of navigation systems such as a radio navigation unit such as Very High Frequency Omni-directional Radio-range (VOR); Automatic Direction Finder (ADF); Tactical Air Navigation (TACAN); and/or Instrument Landing System (ILS). It preferably has a GPS navigation system. It may also include an anti-jam countermeasure such as AJ wavelet processing, Space-Time Adaptive Processing (STAP), and/or Space-Frequency Adaptive Processing (SFAP).

Figure 2:
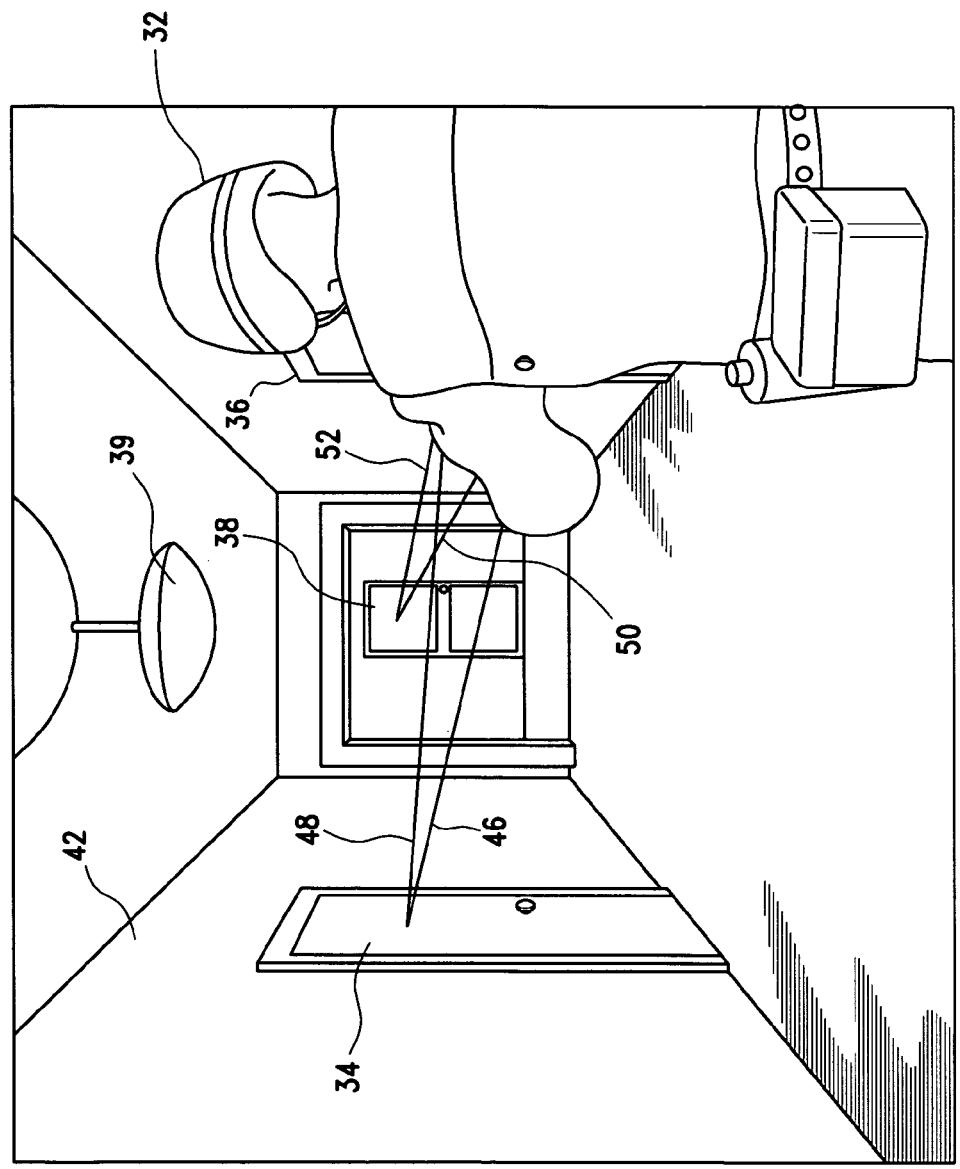
FIG. 2 illustrates implementation of the laser range finding system on a device worn by an operator.

The present invention is designed to be extremely compact. Referring now to FIG. 2, implementation of the navigation and mapping system of the present invention is illustrated by various devices worn by (or held by) an operator 32. The LIDAR NSU 12 may be supported on a vest garment. The LIDAR NPU 14 may be supported, for example, by a leg strap. The handheld computer system 28 can be held in the operator's hand when in use. The LIINS is based on fielded equipment and simplifies logistics requirements by operating for 12 hours on commercial batteries while occupying less than 240 cubic inches volume. Efficient system component partitioning eliminates or minimizes wiring and the numbers of boxes and modules. This systems approach tunes the Flash LIDAR operations to the environment and required tasks (e.g. frame rate, field of view, focal plane array size, sensor spectrum sensitivity, laser frequency selection, eye safe power levels) and uses software algorithms compatible with low power processors and navigation accuracy requirements.

FIG. 2 shows use of the present invention to perform target location on the LIDAR sensor output, construction of a landmark map of the operator's surroundings, and use of the landmark data to update the estimate of the operator's location. The INS provides an estimated position. After the landmarks, e.g. 34, 36, 38, 40 are identified; the Simultaneous Localization and Mapping (SLAM) algorithms use the ranging data and landmark database to select a local constellation of landmark reflectors. SLAM builds a statistical model of the world based on a series of observations. This model hypothesizes the configuration of landmarks and observer position and viewing angles that best accounts for the observations. Observations can be in the form of range, bearing, or a combination of the two. As the number and variety of observations increases, so does the accuracy of the model. SLAM has the unique advantage of optimizing both the estimate of the observer's position and the quality of the landmark map simultaneously. Delta-range measurements are used from image to image to compute velocity measurements.

The zoom optics 20 may comprise, for example, a variable focal length configuration of lenses and mirrors allowing the angle of coverage of the optics to shift from illumination of the full field of view of the LIDAR receiver 22 down to illumination of only a few pixels of the receiver focal plane array. The LIDAR illuminating laser source may include an optical view finder coupled with the zoom optics. The zoom optics can either have a continuously variable focal length or be of a simpler design that is switched between a limited set of fixed focal lengths. In either case, the system would select only those pixels actually illuminated when creating images. Although the illuminating source has been discussed as being a laser, the illuminating source may be some other type of illuminating source such as a light emitting diode, xeon flash lamp or other suitable flash illuminating source. The LIDAR receiver preferably operates as a passive imager part of the time to allow an operator to point the sensor, allowing an area of interest to be centered in a frame.

The sensor 24 may be, for example, a silicon focal plane array for operation in the visible portion of the spectrum or an indium-gallium-arsenide focal plane array for operation in the short-wave infrared portion of the spectrum.

The flash readout IC 26 may be, for example, a collection of parallel charge-coupled, analog shift registers, one per sensor pixel, that are clocked to capture time-sequential samples of the pixel output in real time and subsequently pass the captured charge to a set of analog-to-digital converters that translate the captured signal into digital form for subsequent processing.

Figure 3:
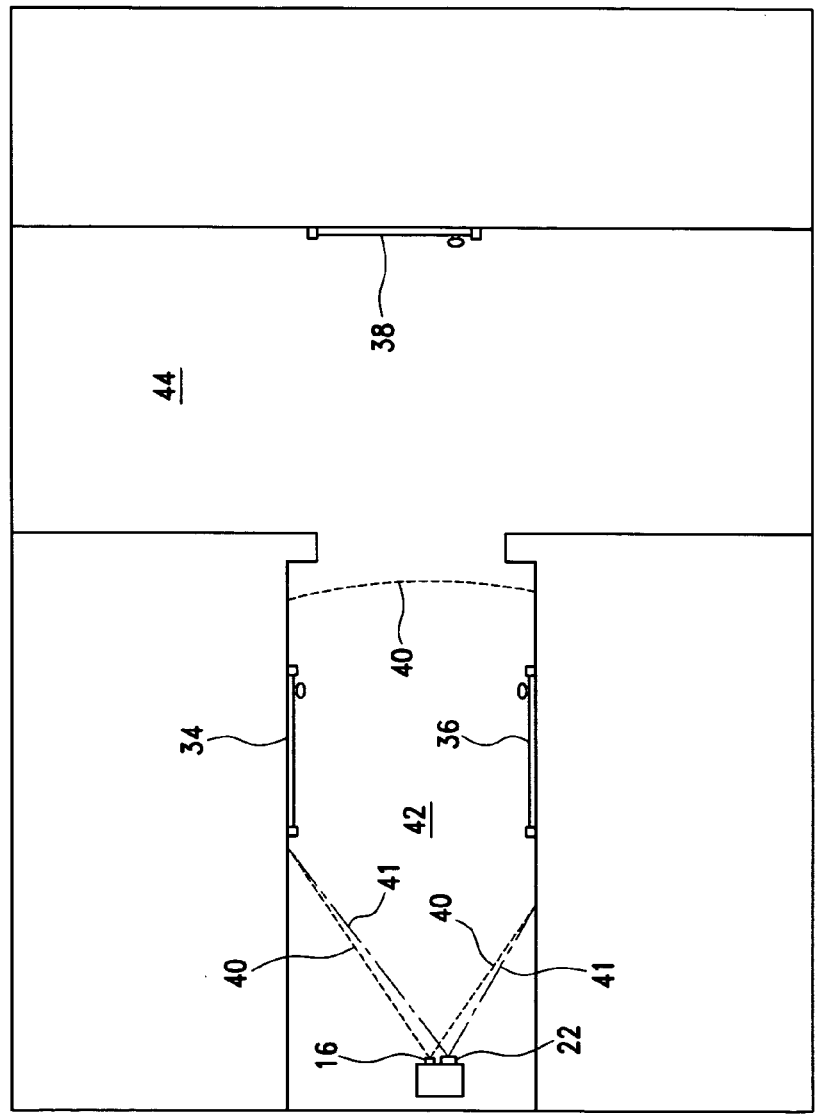
FIG. 3 is a top view of the environment showing the laser range finding system implemented as a navigation and mapping system with the flash LIDAR illuminating laser source zoomed to a "wide" position.

Referring now to FIG. 3, a top view, with the laser zoomed to the "wide" position the transmitting light pulses have a relatively wide range, as indicated by lines 40. The width of the hallway 42 is illuminated and the system can determine ranges to features like the side doors 34, 36 and the light fixture 39 (shown in FIG. 2). The range of received resulting input light signals is denoted 41. The range of the transmitting light pulses 40 is limited by the laser power and the spreading optics so the cross hallway 44 and far door 38 at the end of the hallway 42 are not imaged. As shown in this Figure, the transmitted light pulses have a range 40 to just beyond the doors 34, 36.

Figure 4:
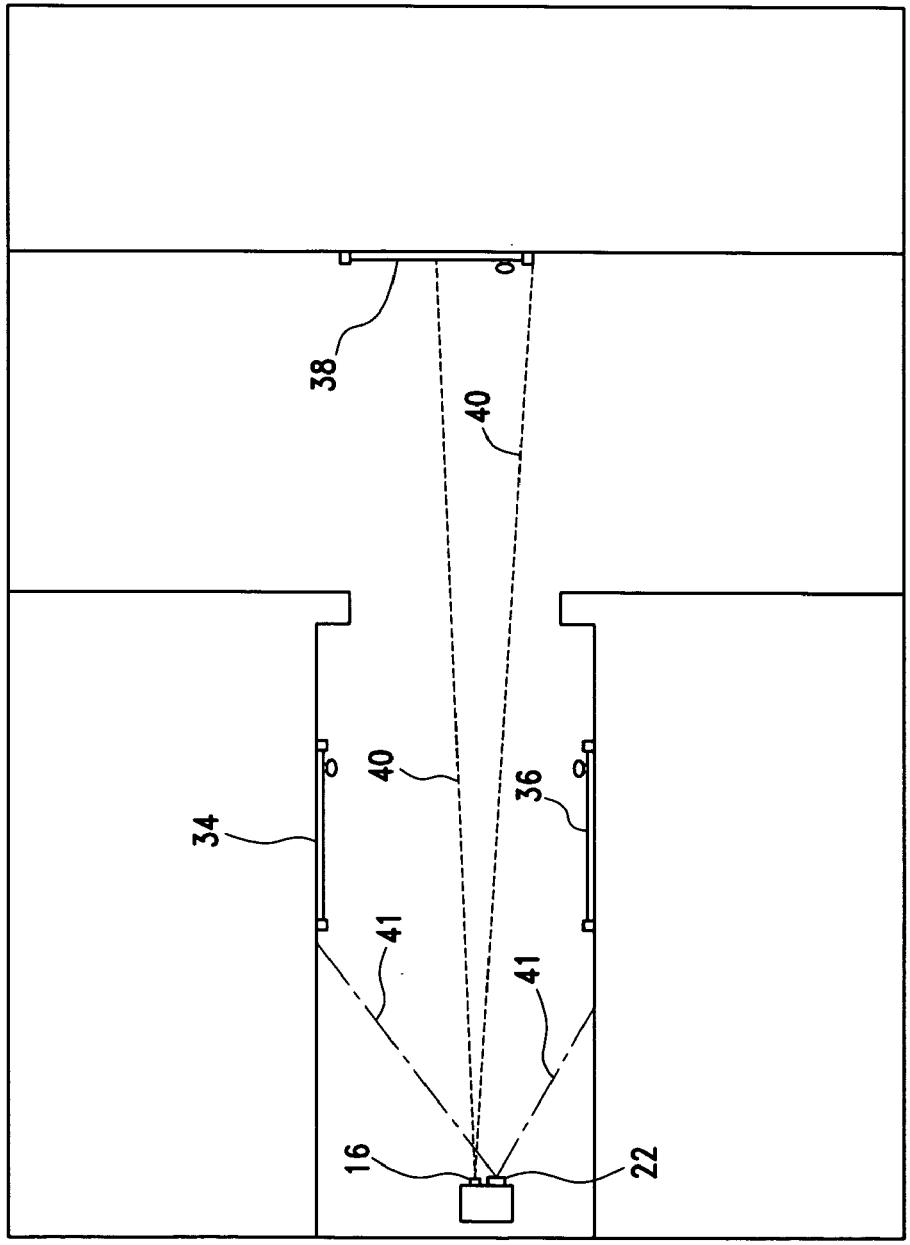
FIG. 4 is a top view of the environment showing the laser range finding system implemented as a navigation and mapping system with the flash LIDAR illuminating laser source zoomed to a "narrow" position.

As can be seen in FIG. 4, with the laser zoomed to the "narrow" position, only a small portion of the receiver focal plane is illuminated by the transmitted light pulses 40. However, the range is extended so that ranges to more distance objects like the far door 38 can be measured. Referring again to FIG. 2, utilization of the zoom feature is shown. In the wide position the distance to the door 34 can be determined as shown by numeral designations 46, 48. In the narrow position the distance to the far door 38 is determined, as shown by numeral designations 50, 52.

Zooming only the optics of the illuminating laser provides an efficient system obviating the need to provide complementary zoom optics on both the laser illuminator and on the receiving focal plane array. A system having two sets of zoom optics would be difficult and cumbersome because the field of view would have to be changed in a synchronized manner.

As mentioned above, with the present invention one operational approach is to operate the receiving focal plane array (camera) as a passive imager part of the time. Since the laser pulse repetition rate is apt to be relatively slow to conserve power anyway, this is quite efficient. This allows the user to point the sensor using the passive image so that the area of interest is centered in the frame. Then, the laser can be pulsed through optics that are zoomed to illuminate just that central area of the frame resulting in a flash lidar image of reduced resolution but increased range. An optical viewfinder may be provided to facilitate this aiming. The passive view finder imagery can be used as input to a SLAM algorithm in addition to the flash lidar range data. This is synergistic because SLAM can be utilized with passive imagery. The system can display substantially continuous passive video to the user (and record it as well) while periodically pulsing the laser and deriving range to the illuminated pixels.

Instead, of using an optical viewfinder, the imager may be operated as a TV camera to facilitate aiming, providing some visual indication of what region the laser is illuminating.

Although application of the inventive concepts herein have been described relative to their utilization with a man-worn system, the present invention can be utilized with a large variety of applications including, for example, unmanned ground vehicles and UAV (unmanned air vehicle) sensors.

Other embodiments and configurations may be devised without departing from the spirit of the invention and the scope of the appended claims.

The invention claimed is:

1. A laser range finding system, comprising:
    a) a light detection and ranging (LIDAR) sensor unit (SU) for transmitting light pulses and receiving resulting input light signals reflected from objects within the field of view of the SU, said LIDAR SU comprising:
        i) a flash LIDAR illuminating laser source for transmitting light pulses, said LIDAR illuminating laser source including an illuminating laser and zoom optics operatively associated with said laser; and,
        ii) a LIDAR receiver for receiving resulting input light signals reflected from the objects, said LIDAR receiver including: a sensor; a flash readout integrated circuit (IC); and, receiver optics, said flash readout IC for measuring the transit time of said light pulses, said receiver optics not including zoom optics;
    b) a LIDAR processor unit (PU) operatively associated with said LIDAR SU, said LIDAR PU utilizing flash LIDAR ranging; and,
    c) a power source operatively coupled to said LIDAR PU, wherein, zooming only the transmitted light pulses results in the received resulting input light signals illuminating a relatively reduced area of the frame, thus providing a flash LIDAR image of relatively reduced resolution but enhanced range by utilization of said transit time measurements.

2. The laser range finding system of claim 1, wherein said LIDAR receiver operates as a passive imager part of the time to allow an operator to point said sensor, allowing an area of interest to be centered in a frame.

3. The laser range finding system of claim 1, wherein said LIDAR illuminating laser source comprises an optical view finder coupled with said zoom optics.

4. The laser range finding system of claim 1, further comprising a computer system coupled to said LIDAR PU for receiving processed navigation and mapping information from said LIDAR PU and providing an optimized geo-referenced map of the path traversed, the laser range finding system operating as a navigation and mapping system, wherein said LIDAR PU comprises a LIDAR navigation processor unit (NPU) and said LIDAR SU comprises a LIDAR navigation sensor unit (NSU).

5. The laser range finding system of claim 4, wherein said LIDAR NSU comprises at least one imaging sensor selected from the group consisting of: Electro-Optic (EO)/Infrared (IR); Low Light Television (LLTV); Synthetic Aperture Radar (SAR); and, Ultra Wide Band (UWB).

6. The laser range finding system of claim 4, wherein said LIDAR NSU comprises at least one communications link allowing exchange of situational awareness data between multiple systems.

7. The laser range finding system of claim 4, wherein said LIDAR NPU solves a simultaneous localization and mapping (SLAM) problem using a thin junction tree filter, thereby correcting real time dead reckoning/inertial measurement unit (IMU) error drift.

8. The laser range finding system of claim 4, wherein said LIDAR NPU comprises at least one radio navigation unit selected from the group consisting of: Very High Frequency Omni-directional Radio-range (VOR); Automatic Direction Finder (ADF); Tactical Air Navigation (TACAN); and, Instrument Landing System (ILS).

9. The laser range finding system of claim 4, wherein said LIDAR NPU comprises a GPS navigation system.

10. The laser range finding system of claim 4, further comprising a foot sensor unit operatively connected to said LIDAR NSU and said LIDAR NPU for improving accuracy Dead Reckoning (DR).

11. The laser range finding system of claim 4, wherein said LIDAR NPU receives output signals from said LIDAR NSU and provides multiple frame averaging thereof for thermal noise reduction.

12. The laser range finding system of claim 11, wherein said providing of multiple frame averaging comprises utilizing a minimal frame rate that allows frame averaging noise reduction minimizing the need for sensor cooling.

13. The laser range finding system of claim 4, wherein said LIDAR NSU and said LIDAR NPU are integrated as a single system.

14. The laser range finding system of claim 1, wherein said LIDAR NSU and said LIDAR NPU are integrated as a single system, comprising:
    a) an inertial measurement unit (IMU) for providing IMU sensor data;
    b) a LIDAR light source for providing reflection data;
    c) a reflection point manager for receiving i) said reflection data from said LIDAR light source, and ii) reflection point location error estimates, and using said reflection data and said error estimates for computing range and range rate measurements;
    d) a Kalman filter for receiving said range and range rate measurements and current estimates of position, velocity and attitude, said Kalman filter providing said reflection point location error estimates to said reflection point manager; and,
    e) a strapdown navigator for receiving i) said IMU sensor data and ii) position, velocity, and attitude error estimates from said Kalman filter; said strapdown navigator integrating said IMU sensor data and said position, velocity, and attitude error estimates to provide said current estimates of position, velocity and attitude,
    wherein, said LIDAR light source is fixed to said IMU so that the measurements from said LIDAR light source may be easily represented in a known reference frame.

15. A method for laser range finding, comprising the steps of:
    a) transmitting light pulses to objects within the field of view of a sensor unit (SU) of a light detection and ranging (LIDAR) sensor unit (SU), utilizing a flash LIDAR illuminating laser source including an illuminating laser and zoom optics operatively associated with said laser;
    b) receiving resulting input light signals reflected from the objects utilizing a LIDAR receiver including: a sensor; a flash readout integrated circuit (IC) for measuring the transit time of said light signals; and, receiver optics, said receiver optics not including zoom optics; and, c) utilizing flash LIDAR ranging via a LIDAR processor unit (PU) operatively associated with said LIDAR SU; wherein, zooming only the transmitted light pulses results in the received resulting input light signals illuminating a relatively reduced area of the frame, thus providing a flash LIDAR image of relatively reduced resolution but enhanced range by utilization of said transit time measurements.

16. The method of claim 15, wherein said LIDAR receiver operates as a passive imager part of the time to allow an operator to point said sensor, allowing an area of interest to be centered in a frame.

17. The method of claim 15, wherein said step of transmitting light pulses comprises utilizing an optical view finder coupled with said zoom optics.

18. The method of claim 15, further comprising a step of utilizing a computer system coupled to said LIDAR PU for receiving processed navigation and mapping information from said LIDAR PU and providing an optimized geo-referenced map of the path traversed, the laser range finding system operating as a navigation and mapping system, wherein said LIDAR PU comprises a LIDAR navigation processor unit (NPU) and said LIDAR SU comprises a LIDAR navigation sensor unit (NSU).

* * * * *